June 28, 1955 F. A. SCHAUFELBERGER 2,711,956
METHOD OF PRECIPITATING COBALT CARBONATE
FROM COBALT-NICKEL SALT SOLUTIONS
Filed Sept. 23, 1952
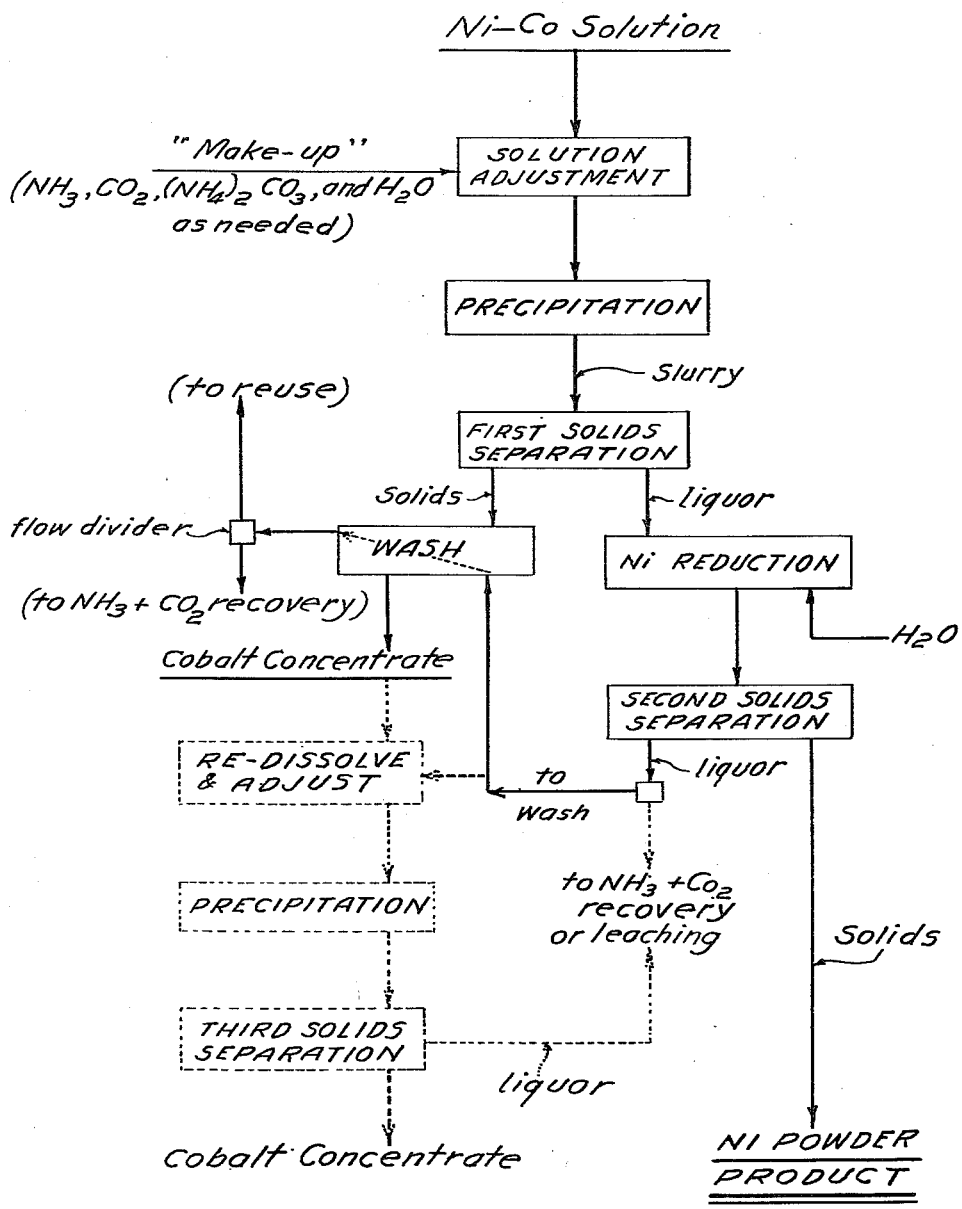
INVENTOR
FELIX A. SCHAUFELBERGER
BY
Walter H. Schneider
ATTORNEY

United States Patent Office 2,711,956
Patented June 28, 1955

2,711,956

METHOD OF PRECIPITATING COBALT CARBONATE FROM COBALT-NICKEL SALT SOLUTIONS

Felix A. Schaufelberger, Yonkers, N. Y., assignor to Chemical Construction Corporation, New York, N. Y., a corporation of Delaware Application September 23, 1952, Serial No. 310,953

6 Claims. (Cl. 75—119)

This invention relates to the hydrometallurgy of nickel and cobalt. More specifically, it is concerned with the selective separation of nickel, acceptably free of cobalt, from solutions containing salts of both nickel and cobalt. Still more particularly, it involves a method whereby substantially all the cobalt content of such solutions is precipitated in a carbonate precipitate, leaving a solution from which metallic nickel is easily precipitated with a reducing gas.

Nickel and cobalt metals are very similar in many physical and chemical characteristics. The same is true of their salts and naturally-occurring minerals. Moreover, minerals of both generally occur together in natural deposits and usually cannot be separated by ordinary mineral dressing practices. For these reasons, both metals are generally present, in varying amounts, in any solution resulting from any type of leaching of materials containing cobalt and nickel.

This results in many technical and economic problems. For example, in most ordinary practices, small amounts of cobalt present in nickel ore concentrates represent little of benefit to the nickel producer. Very little cobalt available in such materials is recovered and sold as such, primarily because by current methods the cost of separation equals or exceeds the additional value. Much, if not most, of the cobalt is lost in the slag from nickel smelting. The remainder is sold as "nickel" in nickel metal bullion or cathodes.

Similarly, small amounts of nickel present in cobalt concentrates, and, therefore, in the "cobalt" solutions after leaching, is of small value. It is generally either discarded, a considerable loss, or is recovered with the "cobalt." In the latter case, the nickel becomes an impurity in the cobalt metal and generally the producer is not paid for it. While certain nickel and cobalt mixed metals are marketable as such, it is usually at a price below the value of the pure metals in separate products.

In conventional metallurgy of nickel and cobalt, then, the presence of smaller but appreciable quantities of either in sources of the other, i. e., in ores, ore concentrates, scrap metals, plant by-products and the like, presents a serious and difficult problem. This problem has heretofore been variously attacked. However, a generally-practicable treatment whereby the bulk of each may be recovered in a separate, relatively-pure metal product has not been offered.

Many processes have been proposed for separation and recovery of cobalt and nickel from mixed electrolytes. Several have been used quite extensively. Most involve the same two facts, that cobalt is more readily oxidized to the trivalent state than is nickel and that cobaltic hydroxide is relatively more insoluble at lower pH values than is nickelous hydroxide. Unfortunately, the necessary steps are complicated and repetitive, the hydroxides are difficult to filter efficiently and the resultant separations are far from perfect. Moreover, most of them also require large quantities of chemical reagents, many of which are non-regenerative. In addition to the effect on costs, this creates a disposal problem.

Several methods of separating nickel and cobalt from ammonium carbonate leach liquors also have been proposed. In general, they involve fractional distillation of the ammonium carbonate. Liquor, at different stages in the process, thereby becomes concentrated with either nickel or cobalt by precipitation of the other as hydrated oxides. Concentrated liquor is removed and treated. The precipitates must be redissolved and retreated. However, as processing methods or as to final products, these are economically and practically little better than the electrolyte treatments.

Such conventional processes for the production of nickel or cobalt product, then, are commercially unsatisfactory as too complicated, wasteful or uneconomical or as resulting in products containing undesirably large amounts of the other element. Neither do they produce saleable metals. The resultant oxides or hydroxides must be processed further to obtain this result.

It is, therefore, the principal object of this invention to provide an improved method, one capable of separation of cobalt and nickel, either from acidic or ammoniacal solutions containing salts of both metals. Such a method should not be subject to the objections to the prior practice. Both metals should be capable of being economically recovered. If possible, such a process should involve only the use of commonly-available chemical reagents which may be either regenerated or sold as by-products.

Surprisingly, the desired objects of the present invention have been achieved in a simple, economical process. A general outline thereof may be quite simply stated. The solution containing the mixed salts is subjected to elevated temperatures in the presence of available ammonia and of ammonium carbonate. When the temperature and dissolved contents are correctly controlled, cobalt is precipitated quantitatively as a carbonate, leaving a substantially cobalt-free solution. From the latter nickel may be recovered readily.

In the present specification and claims the terms "free" or "available" ammonia are used. Where this is done, it is intended to designate any ammonia dissolved in the solution per se or as ammonium hydroxide and any ammonia combined with the metals as metal-ammonia complex ions.

It is believed that description of the invention may be more readily followed with reference to the accompanying drawing. Therein, in simplified form, is shown a flow diagram of the principal steps in the process of this invention.

In the drawing, feed to the process of the present invention is designated as a nickel-cobalt (Ni-Co) solution. So far as the present process is concerned, the origin of this solution is irrelevant. Methods are known whereby the nickel and cobalt content of various sources such as ore concentrates, plant by-products, and the like may be put into solution, sufficiently free from other extraneous metals and impurities with which the nickel and cobalt may have been associated. Any of such processes may have been used as the source of the feed solution here.

In general, the applicability of the present process is not limited to the treatment of solutions containing salts of particular acids. Provided the anions do not produce cobalt and nickel salts less soluble than the carbonates, the process may be utilized thereon. Anions which form strong complexes, such as cyanide, should be avoided. As a practical matter, the sulfates and carbonates will be those most commonly encountered and will be taken as illustrative.

For best operation of the present process, however, the solutes content of the solution should be within certain limits. Initially, the various salts should be in solution. Premature precipitation should be avoided. On the other hand, substantially all the cobalt must be precipitated while retaining the nickel. Accordingly, the first step is shown as a solution adjustment. Herein the necessary "makeup" of reactants or diluents are added to bring the dissolved constituents within the operating limitations. Since, as noted above, the feed solution will have been treated to eliminate metallic elements other than cobalt and nickel, for practical purposes the only materials that need be considered here are the quantities of cobalt, nickel salts and ammonium salts of the acid and the amounts of ammonium carbonate and of available ammonia.

Where in the present discussion of the process the adjustment of ammonium carbonate content is noted, actual addition may be done in several ways. It may be added as a solid or as a solution. Alternatively, ammonia and $CO_2$ may be added separately or together as gases or dissolved in water. Mention in the claims of ammonium carbonate adjustment or addition, therefore, contemplates any of these methods.

The applicability of this process is not restricted to any particular proportions of nickel to cobalt in the solution. Solutions containing high-nickel, low-cobalt contents; nickel and cobalt in approximately equal amounts; and low-nickel, high-cobalt concentrations all may be handled. In general, the total dissolved metal contents should not be too high. However, metal salt concentrations up to an equivalent of about 100 grams/liter of metallic nickel plus cobalt if dissolved as carbonates and 135 grams/liter of metal if dissolved as sulfates can be readily handled. A preferred range of from about 40 up to about 65–70 grams/liter for carbonates and 80–90 for sulfates constitutes a good average practice. While the process is operable below about five grams/liter, such solutions are too dilute to be economically practicable.

Whether the initial feed solution contains sulfates, carbonates or some other anions, during the present process both nickel and cobalt carbonates are formed, if not already present. Neither cobalt nor nickel carbonate is sufficiently soluble in water to permit dissolving the amounts of these elements referred to in the previous paragraph. Sufficient solubility here is due to the formation of some ammoniacal complex. Formation of the latter requires free ammonia in adequate amount. However, solubility of the complex in the solution depends not only on the available ammonia but also the ammonium salt concentration. The latter may include ammonium sulfate, if sulfate solutions are treated. In any case, enough ammonium carbonate should be included to insure precipitation of that salt of the cobalt. Accordingly, the salt will be referred to as ammonium carbonate herein.

Nickel and cobalt form various complexes with ammonia. Those in which the ammonia:metal ratio is about two or more cause a large increase in solubility of salts of these elements in near neutral solution. The amounts of available ammonia and ammonium carbonate required to obtain optimum results will depend to some extent upon the anions present. As to carbonates and sulfates, the principal salts encountered in commercial practice, the amounts of available ammonia is a major factor in keeping the cobalt in solution. To insure complete solution, a good general practice is to add about two mols of ammonia for each mol of cobalt plus nickel. The available ammonia:metal ratio may be greater than two, but it must not be so high that complete precipitation of cobalt is prevented by the increase in available ammonia as the first fractions precipitate.

Nickel solubility is increased with increasing amounts of either ammonia or ammonium salt. In the range in which adding more ammonia would tend to excessively increase cobalt carbonate solubility it is best to use ammonium salt, i. e., carbonate, for this purpose. Even though nickel solubility after cobalt precipitation may be assured by increasing the concentration of ammonium carbonate, cobalt solubility may be decreased by an excessive amount. The use of both ammonia and ammonium carbonate in correct balance is therefore essential.

In general practice, from about 50 to about 300 grams of ammonium carbonate per liter of solution will be used, depending on the other solutes content. In some cases this range will be extended. Ordinarily the ammonium carbonate to total metal mol ratio will vary from about one to three for carbonate liquors. For solutions containing cobalt and nickel in high ratios, i. e., 5:1 or higher, the ammonium carbonate:metal ratio may be as low as 1:1. For lower cobalt:nickel ratios, from about 1:1 and lower, the ammonium carbonate:metal ratio may be as high as three or four.

In the preceding paragraphs the optimum ammonia:metal and ammonium carbonate:metal ratios have been discussed for carbonate liquors. In the case of sulfate liquors, these ratios must be adjusted slightly. Particularly is this true as to the ammonium carbonate since it will be the only source of carbonate ions. In general, the ammonia:metal and ammonium carbonate:metal ratios should be increased about one unit in treating sulfate solutions.

Precipitation, the next step shown in the drawing, may be carried out in any available pressure vessel. Its lining should be resistant to attack at the operating conditions and temperature. Stirring during reaction is desirable but not necessarily indispensable. Preferably, the vessel should be equipped therefor, and should be designed to withstand pressures of about 200 pounds per sq. in. or higher.

Under the above-discussed conditions, precipitation of the cobalt as cobalt carbonate is very complete and very rapid at the necessary temperature. In general, for solutions adjusted as described above, cobalt precipitation may be complete within industrial purity limitations above about 140° C. and substantially quantitative above about 155° C. For solutions adjusted as discussed above and containing above about five grams/liter of dissolved cobalt, temperatures below this level may not produce complete cobalt precipitation. Temperatures above this limit may be used if so desired. However, they put excessive restrictions on the apparatus and are unnecessary. Precipitation is usually complete at about 155°–170° C. in some 5–15 minutes, although it is sometimes desirable to hold the precipitation temperature for as long as about 30 minutes at the lower temperatures.

As noted above, feed solution will generally have been subjected to previous treatments for the removal of extraneous metal contents. The cobalt content of the feed solution, therefore, will usually be in its bivalent form and will precipitate as a carbonate. Any three valent cobalt which may be present will precipitate as an oxide during the above described heating, thus insuring a substantially cobalt-free nickel solution.

It is a particular advantage of the present invention that the precipitate is easily filtered and washed. It shows no tendency to adhere to the vessel. This is in marked contrast to the problems encountered in previous practices which produced, during distillation, hydrates and basic carbonates.

Slurry from the precipitation step is subjected to a solids separation, either before or after pressure release. A filter, suitable decantation, and centrifugal separation in their various mechanical adaptations may be used. While not necessarily a limitation, separation under pressure is desirable. Heat, gas and time may be saved if the fluid, after solids removal, can be sent directly to the next step in the general process. This is normally a nickel reduction as shown in the drawing.

Nickel can be precipitated, for the purposes of the present invention, by any known method. The nickelbearing liquor will be very low in cobalt, usually less than 0.1 gram/liter, regardless of the nickel content. One suitable method of nickel precipitation is to produce nickel metal powder by chemical reduction, as shown in my copending application for United States Letters Patent, Serial No. 276,710, filed March 14, 1952.

As shown therein, from liquors containing salts and ammonia, whether the salts are originally present in solution as electrolytes such as sulfates of ammoniacal complexes or carbonates, nickel can be reduced almost quantitatively at from about 250° F. for carbonates and 300° F. for sulfates using a positive partial pressure of hydrogen of from about 10 to about 1000 pounds per sq. in. gauge. This can be done without the necessary use of any seed metal and without the product exhibiting tendency of metal to stick to the vessel walls. Product nickel powder is obtained substantially free from occlusions, as a readily-filtered and washed solid.

While other chemical or electrolytic nickel precipitation methods may be used, if so desired, it will be assumed that the process of my copending application will be used here. Accordingly, the metal nickel powder is separated from the residual liquor by conventional filtration or the like, either before or after pressure relief. Relieving the pressure before filtration, or its equivalent is perhaps simpler. Usually but little $NH_3$ and/or $CO_2$ is released during the pressure reduction. If so desired, they may be reabsorbed for reuse.

The collected nickel is washed and dried according to conventional processing methods and, accordingly, these steps are not shown, being considered as part of the second "solids separation" step. Preferably, at least the latter part of the drying operation should be carried out in a reducing atmosphere to prevent oxidation. The product is readily saleable as high-purity nickel.

Returning to the first solids separation, that of collecting the cobalt concentrate, it will be seen that this product is largely cobalt carbonate. It may contain a minor nickel content, also as carbonate. In the case of precipitation from sulfate solutions, this product is surprisingly free from sulfate ions. Its content of the latter ordinarily will be less than 0.05%. This carbonate precipitate may be collected, washed and disposed of in any suitable manner.

One washing procedure is shown in the flowsheet. Part of the liquor from the second solids or metallic nickel separation step is used to wash the cobalt carbonate collected in the first solids separation. Washings are usually divided. Part is recycled for reuse. The remainder, if any, is treated to recover ammonium carbonate, either per se or as $NH_3$ and $CO_2$. Normally, the reuse operations will constitute part of some leaching operation which, as noted above, is not a part of the present invention. Again it may be recycled simply as part of the feed liquor or as a part of the solution adjustment liquor.

The remainder, if any, of the liquor after nickel removal, is also usually reused in leaching additional material. If not needed or desired for this purpose, it too may be treated, like the above-noted washings, to recover $NH_3$ and/or $CO_2$, per se or as carbonates. Where sulfate rather than carbonate liquors are being used, both this residual amount of liquor and the washings may be treated to recover ammonium sulfate, if so desired.

The cobalt carbonate solids may be handled in any of several ways. They may be sold as such or they may be calcined in some conventional operation to obtain an easily-marketed oxide concentrate. They will contain substantially all the original cobalt. In some cases they may contain nickel carbonate in varying amounts, depending largely upon the original Co:Ni ratio. The ratio of cobalt to nickel in this concentrate may vary from about 1:1 where the original Co:Ni ratio was low to about 50:1 where the original ratio was high.

If desired, the Co:Ni ratio in the cobalt carbonate product may be readily improved. Since this is an optional procedure, it has been shown in dotted lines. The mixed carbonates are redissolved, as for example, in any one of the recycle liquors noted above. The solution usually will then be adjusted, about to the conditions discussed above. Cobalt carbonate is reprecipitated with more carbon dioxide and/or ammonium carbonate. The residual liquor, like the others, is recycled for its metal content or treated to recover $NH_3$ and $CO_2$, per se or as ammonium carbonate. In such a treatment, a product of a 5:1 ratio is readily brought to a 50:1 ratio or better. Nickel so recovered will usually pay for the added treatment, leaving the increased grade of cobalt carbonate as gain.

As was discussed, it is the loss of cobalt in the nickel "product" which is the greatest source of trouble in the previously known types of operations. In the present process this loss is substantially eliminated.

The efficiency of the process of the present invention may be seen from the following examples which are given as illustrative only and not by way of limitation. Except as noted, all parts are in grams per liter, calculated as equivalent weights; percentages are by weight; and pressure is gauge reading.

*Example 1*

A sample of Cuban garnierite ore is leached with conventional ammoniacal-ammonium carbonate leaching liquor and method to produce a liquor containing, after adjustment, 17 grams/liter nickel as carbonate, 0.6 gram/liter cobalt as carbonate, 150 grams/liter $NH_3$ as aqua ammonia and 150 grams/liter of ammonium carbonate. This liquor is heated for about 20 minutes at 165° C. The resultant cobalt carbonate concentrate contains about 83% of the cobalt and 2% of the nickel; the filtrate contained only 0.1 gram per liter of cobalt. In the precipitate, the nickel:cobalt mol ratio is about 1:1 before washing and about 1:2 after washing.

*Example 2*

The cobalt concentrate of Example 1 is redissolved in ammoniacal ammonium carbonate liquor containing some 300 parts of $NH_3$, about half as ammonium carbonate. After reprecipitation by heating, to about 155°–160° C., the cobalt concentrate contained less than 5% nickel.

*Example 3*

A solution of nickel and cobalt sulfates containing 21.5 grams cobalt/liter and 28 grams nickel/liter is adjusted to contain about 50 grams/liter of free $NH_3$ and 280 grams/liter of ammonium carbonate. On heating at about 160° C. for about 20 minutes and collecting the resultant precipitate, the latter is found to contain 99.4% of the cobalt and less than 0.02% sulfate. The Co/Ni ratio of the washed residue is about 7:1. The filtrate contains 22.4 grams/liter of nickel and 0.1 grams/liter of cobalt.

I claim:

1. In the separation of nickel from aqueous solutions containing dissolved nickel and cobalt salts selected from the group consisting of sulfate and carbonate, the steps which include: adjusting the solutes content of the solution to contain up to about 100 grams/liter of combined dissolved cobalt plus nickel in carbonate liquors and up to about 135 grams/liter for sulfate liquors, about one to about four mols of ammonium carbonate/mol of dissolved cobalt plus nickel and sufficient available ammonia to hold the cobalt and nickel in solution at atmospheric conditions; heating the adjusted solution to above about 140° C. at a pressure at least equivalent to that autogenously generated and maintaining such conditions until precipitation substantially ceases, and removing precipitate, whereby a substantially cobalt-free solution of nickel and a precipitate of cobalt carbonate are obtained.

2. A process according to claim 1 in which the salt is sulfate.

3. A process according to claim 1 in which the salt is carbonate.

4. In the separation of high-purity nickel from aqueous solutions containing dissolved nickel and cobalt salts selected from the group consisting of sulfate and carbonate, the steps which include: adjusting the solutes content of the solution to contain up to about 100 grams/liter of combined dissolved cobalt plus nickel in carbonate liquors and up to about 135 grams/liter in sulfate liquors, about one to about four mols of ammonium carbonate/mol of dissolved cobalt plus nickel and sufficient available ammonia to hold the cobalt and nickel in solution at atmospheric conditions; heating the adjusted solution to above about 140° C. at a pressure at least equivalent to that autogenously generated and maintaining such conditions until precipitation substantially ceases; collecting precipitate; dissolving precipitate to form a solution having said metal, ammona and ammonium carbonate contents; heating resultant solution at above about 140° C. at a pressure at least equivalent to that autogenously generated and maintaining such conditions until precipitation substantially ceases, again removing precipitate and collecting the residual solutions of cobalt-free nickel from both precipitations.

6. A process according to claim 4 in which the salt is sulfate.

7. A process according to claim 4 in which the salt is carbonate.

References Cited in the file of this patent

UNITED STATES PATENTS

| | | |
|---|---|---|
| 2,232,527 | Hill | Feb. 18, 1941 |
| 2,290,313 | Caron | July 21, 1942 |
| 2,531,336 | Hills et al. | Nov. 21, 1950 |